J. HARMAN.
ROCK PICKER FOR PICKING UP ROCKS, &c.
APPLICATION FILED JUNE 14, 1911.
1,023,736.
Patented Apr. 16, 1912.
2 SHEETS—SHEET 1.
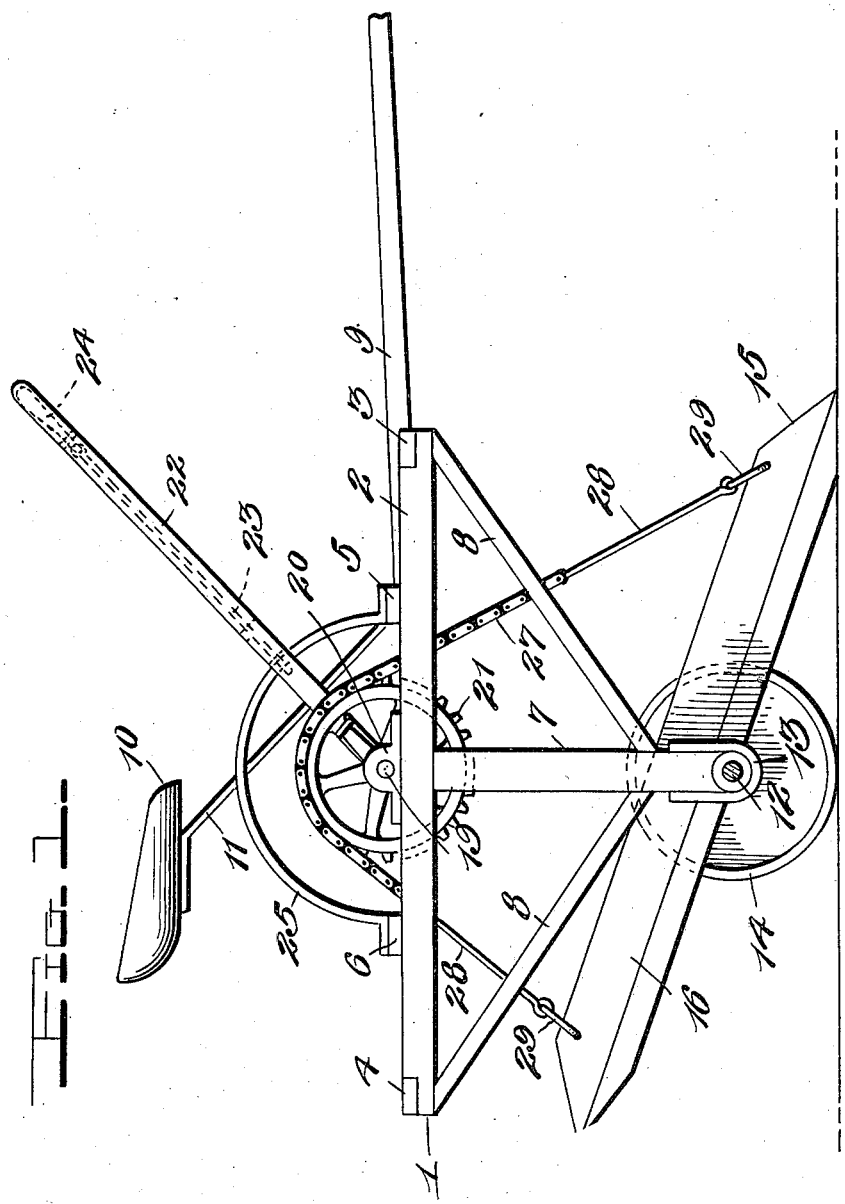
Witnesses
Chas. L. Griestauer.
L. G. Ellis.
Inventor
Joseph Harman,
By Watson E. Coleman.
Attorney J. HARMAN.
ROCK PICKER FOR PICKING UP ROCKS, &c.
APPLICATION FILED JUNE 14, 1911.
1,023,736.
Patented Apr. 16, 1912.
2 SHEETS—SHEET 2.
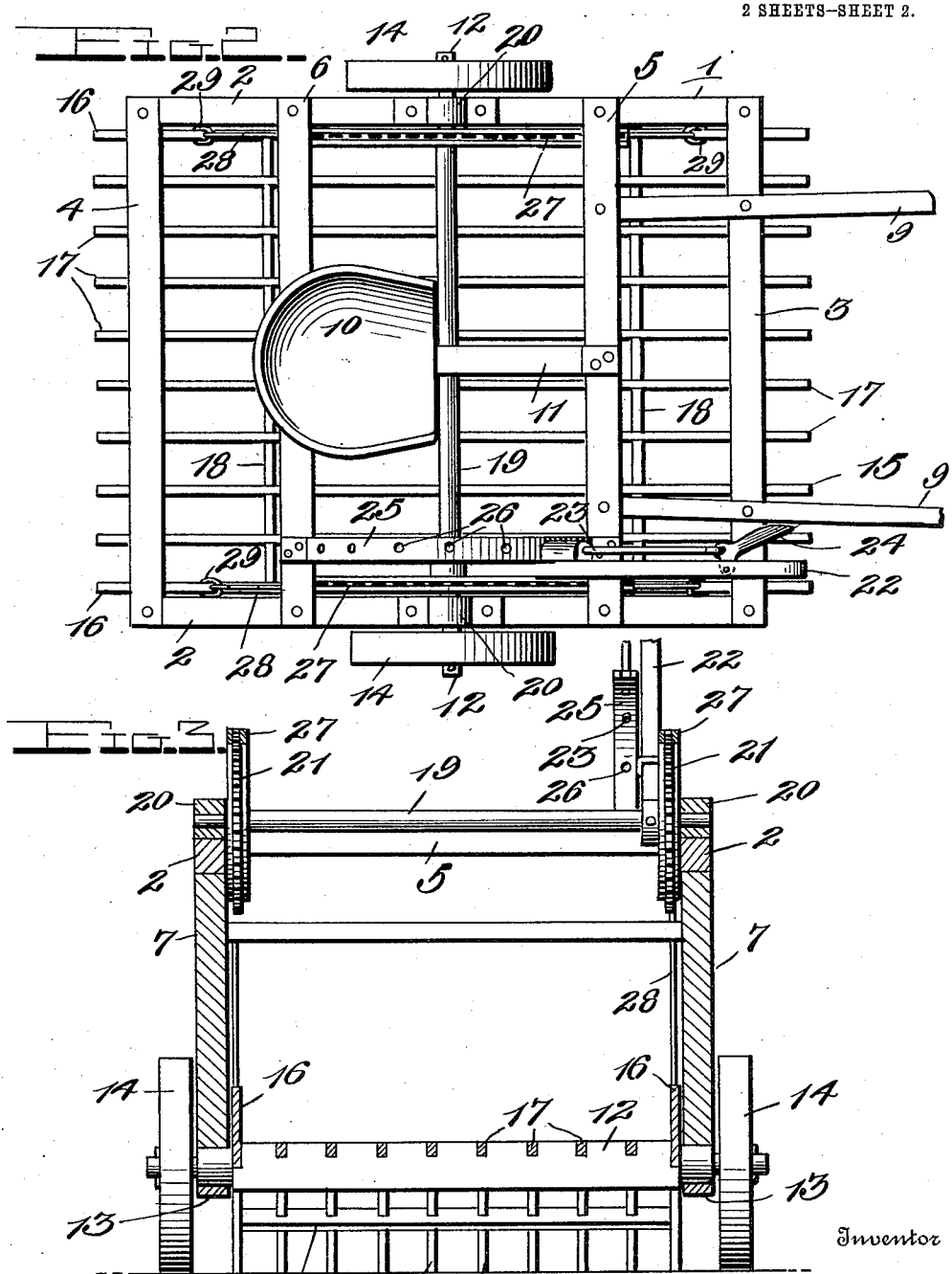
Witnesses
Chas. L. Griestauer.
L. G. Ellis.
Inventor
Joseph Harman,
By Watson E. Coleman
Attorney

UNITED STATES PATENT OFFICE.

JOSEPH HARMAN, OF HAMBLETON, WEST VIRGINIA.

ROCK-PICKER FOR PICKING UP ROCKS, &c.

1,023,736.        Specification of Letters Patent.        Patented Apr. 16, 1912.

Application filed June 14, 1911. Serial No. 633,035.

*To all whom it may concern:*

Be it known that I, JOSEPH HARMAN, a citizen of the United States, residing at Hambleton, in the county of Tucker and State of West Virginia, have invented certain new and useful Improvements in Rock-Pickers for Picking Up Rocks, &c., of which the following is a specification, reference being had to the accompanying drawings.

This invention is an improved scraper and loader especially adapted for use in picking up stones from fields or roads and also adapted for analogous uses, the object of the invention being to provide an improved machine of this kind which is exceedingly simple in construction, is strong and durable and in which the scoop or scraper may be tilted in either direction so as to take up and discharge stones or other like objects from either end, the invention consisting in the construction, combination and arrangement of devices hereinafter described and claimed.

In the accompanying drawings Figure 1 is a side elevation, partly in section, of a scooping and loading machine constructed in accordance with my invention; Fig. 2 is a plan of the same; and Fig. 3 is a partial transverse sectional view of the same.

The frame 1 is here shown as rectangular in form comprising the side bars 2, the front cross bar 3, the rear cross bar 4 and front and rear intermediate cross bars 5 and 6. A pair of standards 7 have their upper ends secured to the side bars 2 at points substantially midway between the front and rear ends of the frame and these standards are braced by inclined braces 8 which extend from near the lower ends of said standards to the front and rear ends of the frame. Suitable draft devices are, in practice, provided for the machine, a pair of thills 9 being here shown. A seat 10, for the driver, is mounted on a spring support 11, the front end of which is secured on the center of the front intermediate bar 5.

The axle 12 is mounted in bearings 13 at the lower ends of the standards 7, so that the axle may be turned, and on the spindle 50 of the axle are a pair of supporting wheels 14. The scoop 15 comprises a pair of side members 16, a series of longitudinally disposed bars 17 which are spaced apart and secured to cross bars 18, which cross bars also connect the side members 16. Two of the cross bars 18 are near the center of the scoop and bear on opposite sides of the axle 12 and the axle is provided on its upper side with recesses for the reception of the centers of the longitudinal bars 17, the said bars being secured to the axle as well as to the cross bars 18. Hence, in effect, the axle is a part of the scoop, the latter extending forwardly and rearwardly from the axle and being adapted to be tilted or inclined so that both its front and its rear ends may be raised or lowered.

A rock shaft 19 is mounted in a pair of bearings 20 which are secured on the centers of the side bars 2. A pair of sprocket wheels 21 are secured to the rock shaft near its ends and to one of these sprocket wheels is secured a lever 22. The lever has a spring-operated dog 23 and a handle 24 to actuate the dog, and a locking segment 25, which is concentric with the rock shaft 19, has its ends secured on the intermediate cross bars 5 and 6 of the frame 1 and is provided at suitable points with openings 26, any one of which may be engaged by the dog 23 and hence the lever may be locked by the co-action of the dog and the segment in any desired position. Sprocket chains 27 engage the upper sides of the sprocket wheels 21 and their ends are connected by rods 28 and links 29 to the side members 16 of the scoop, near the ends of the said side members. It will be understood that, the scoop being thus connected to the rock shaft, the scoop may be turned, by operating the lever 22, either to a horizontal position or inclined either forwardly or rearwardly.

In the operation of the machine, when the same is drawn forwardly and it is desired to gather stones or other like objects which are on or near the surface of a field or road, the front end of the scoop is depressed and set at the required point and as the machine moves forwardly the stones or other objects will be gathered on the scoop and will accumulate there, as will be understood. In order to discharge the objects which are thus gathered on the scoop it is only necessary to turn the latter so as to raise its front end and lower its rear end, thus causing the stones or other objects on the scoop to be discharged by gravity from the rear end thereof. When it is desired to convey the stones or other objects which have been picked up on the scoop to a distance, this may be accomplished by setting the scoop in a horizontal position after it has been loaded, as will be understood.

While I have herein shown and described what I now consider a preferred form of my invention I would have it understood that modifications may be made within the scope of the appended claim.

Having thus described my invention I claim:

A machine of the class described comprising a frame having means whereby it may be drawn and further provided with a pair of depending standards at its sides, a scoop medially pivotally mounted between the standards, supporting wheels for the machine, a rock shaft extending transversely on the main frame, bearings for the rock shaft, a lever to turn said rock shaft, locking means for the lever, sprocket wheels secured to the rock shaft, sprocket chains engaging the upper sides of the sprocket wheels and connections between the ends of the chains and the ends of the scoop, substantially as described.

In testimony whereof I hereunto affix my signature in the presence of two witnesses.

JOSEPH HARMAN.

Witnesses:
 FLOYD HARMAN,
 W. C. PARSONS.

---

Copies of this patent may be obtained for five cents each, by addressing the "Commissioner of Patents, Washington, D. C."